Figure 1:
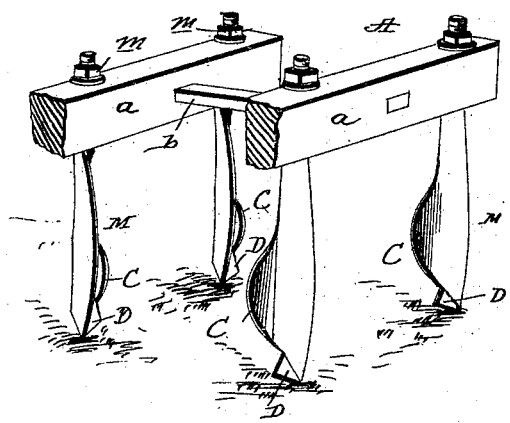

(No Model.) 2 Sheets—Sheet 1.

F. X. KRABACH.
HARROW OR CULTIVATOR TOOTH.

No. 489,960. Patented Jan. 17, 1893.

Witnesses:
C. H. Roeder
T. E. Turpin

Inventor:
Frank X. Krabach
By James Sheehy
Attorney (No Model.) 2 Sheets—Sheet 2.
F. X. KRABACH.
HARROW OR CULTIVATOR TOOTH.
No. 489,960. Patented Jan. 17, 1893.
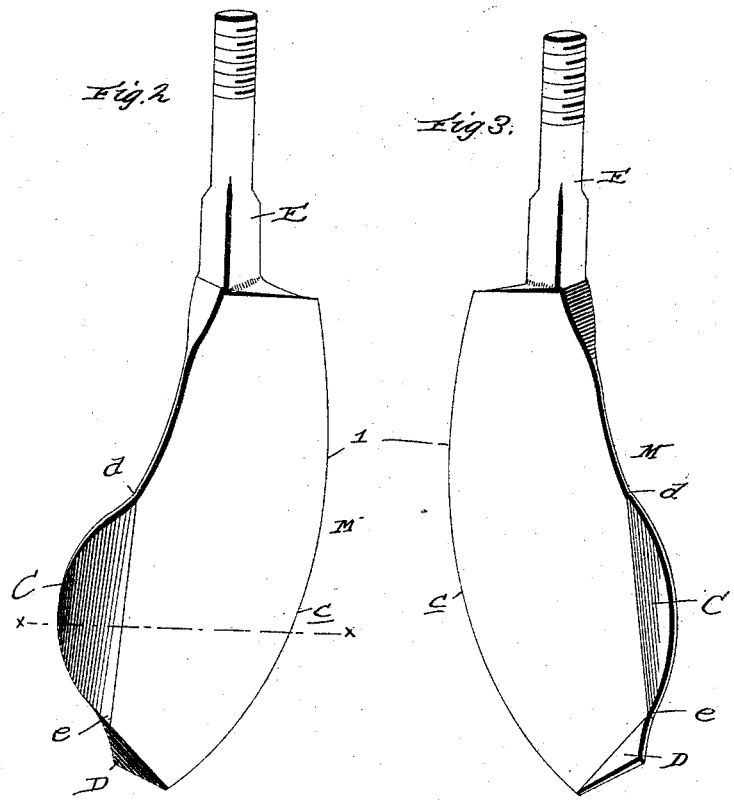
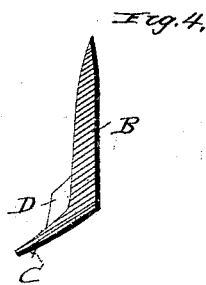
Witnesses:
C. H. Raeder
T. E. Turpin
Inventor
Frank X. Krabach.
By James J. Sheehy
Attorney

UNITED STATES PATENT OFFICE.

FRANK X. KRABACH, OF DEFIANCE, OHIO.

HARROW OR CULTIVATOR TOOTH.

SPECIFICATION forming part of Letters Patent No. 489,960, dated January 17, 1893.

Application filed September 26, 1892. Serial No. 446,940. (No model.)

*To all whom it may concern:*

Be it known that I, FRANK X. KRABACH, a citizen of the United States, residing at Defiance, in the county of Defiance and State of Ohio, have invented certain new and useful Improvements in Harrow or Cultivator Teeth; and I do declare the following to be a full, clear, and exact description of the invention, such as will enable others skilled in the art to which it appertains to make and use the same.

My invention has relation to improvements in harrows, and cultivators, and teeth therefor, and it is designed more particularly as an improvement upon the construction disclosed in my prior Letters Patent No. 461,837, dated October 27, 1891.

The general object of my present invention is to provide teeth so constructed and relatively arranged in a frame that they will be of easy draft and will serve effectively to cut and crush clods &c. and cover wheat and other grain that is sown broadcast.

A further object of the invention is to provide a tooth embodying such a construction that it will not pull the weeds, straw or manure out of the ground when the same is plowed under, but will cut and work down and mix the soil and will pulverize the same just below the surface and thereby form a good bed for the seed.

Other objects and advantages will be fully understood from the following description and claims when taken in connection with the annexed drawings in which:—

Figure 1, is a perspective view of a harrow embodying my invention, in which view is shown the relative arrangement of the teeth. Fig. 2, is a perspective view of one of the teeth, looking at one side thereof. Fig. 3, is a similar view looking at the opposite side of the tooth, and:—Fig. 4, is a horizontal, transverse section taken in the plane indicated by the line $x, x$, of Fig. 2.

In the said drawings similar letters designate corresponding parts throughout the several views, referring to which A, indicates a harrow frame which may be of any ordinary or approved construction, and which preferably comprises transverse beams as $a$, and suitable connecting bars as $b$.

M, indicates my improved cultivator teeth which are preferably formed respectively from a single piece of metal and comprise a tooth or blade B, a flange or wing C, and an auxiliary cutter D, and a suitable shank as E. The tooth or blade B, which increases in thickness rearwardly as shown, is provided with a forward, longitudinal cutting edge $c$, which is approximately straight from its upper end to the point $l$, from whence it is curved downwardly, and inwardly, and describes a convex curve, whereby it will readily take through the earth and will easily cut whatever vegetation there may be in its path. This tooth or blade B, has its rear thickened edge slightly inclined upwardly and rearwardly as shown, and from this rear thickened edge, at an intermediate point in the length thereof, extends the flange or wing C, which rests in a vertical plane and is pitched rearwardly and laterally with respect to the blade, as illustrated. This wing C, has its outer edge curved convexly as shown from its upper end $d$, to its lower end $e$, and it is designed to assist in the pulverizing of the upper or top soil and turn the same, and such trash or manure as may be cut by the blade B.

Extending laterally, rearwardly, and downwardly from the lower end of the blade B, and at the lower end of the flange or wing as C, is the auxiliary cutter D, which serves to loosen the soil and cut any roots or trash beneath the surface, and also tends to lessen the draft by raising the soil as it is cut by the edge of the blade B. The shanks E, of the teeth M, are preferably threaded as shown, to receive the nuts $m$, through the medium of which they are preferably secured to the frame beams $a$, although any suitable means may be employed for effecting such attachment.

As illustrated in Fig. 1, of the drawings, the teeth M, of one beam are pitched in opposite directions or are reversed with respect to the teeth of the next or alternate beam; or in other words the blades B, of the teeth of one beam rest in parallel, transversely-oblique planes while the blades of the teeth of the next or alternate beam rest in parallel transversely-oblique planes at approximately right angles to the planes of the blades of the first named beams, and the flanges or wings of the blades of one beam extend in opposite directions with respect to the flanges or wings of the blades of the next beam. By this construction it will be readily perceived that the foremost teeth will serve to loosen and turn the soil, manure &c, in one direction, while the teeth of the next succeeding beam will loosen and turn the soil, manure &c, in the opposite direction, thus insuring a thorough pulverizing of the soil, and mixing of the soil or manure and decayed vegetable matter so as to form a very fertile bed for the seed.

In some cases the component parts of my improved cultivator tooth may be made separately and be suitably connected together, and I therefore do not desire to be confined to forming the said parts integral as before described.

Having described my invention what I claim is:—

1. As an improved article of manufacture, a cultivator or harrow tooth, comprising a blade increasing in thickness rearwardly and having the forwardly vertically disposed cutting edge, the rearwardly and laterally pitched flange or wing extending from the rear edge of the blade at an intermediate point in the length thereof, and the laterally and downwardly extending auxiliary cutter at the lower end of the blade, substantially as and for the purpose set forth.

2. In a harrow or cultivator, the combination with a frame comprising a series of beams suitably connected together and a series of teeth carried by one beam and comprising the blades resting in parallel, transversely-oblique, vertical planes, the flanges or wings extending rearwardly and laterally in one direction from the rear edges of the blades, and the auxiliary cutter extending downwardly and laterally in one direction from the lower ends of the blades; of a series of teeth carried by the next or alternate beam and comprising the blades resting in parallel, transversely oblique, vertical planes at approximately right angles to the planes of the teeth of the first named beams, the flanges or wings extending rearwardly and laterally from the rear edges of the blades in opposite directions with respect to the flanges or wings of the teeth of the first named beam, and the auxiliary cutters extending downwardly and laterally from the lower ends of the blades in opposite directions with respect to the cutters of the teeth of the first named beam, substantially as specified.

In testimony whereof I affix my signature in presence of two witnesses.

FRANK X. KRABACH.

Witnesses:
F. L. HAY,
JOHN W. WINN.